US008717845B2

(12) United States Patent
Boberg et al.

(10) Patent No.: US 8,717,845 B2
(45) Date of Patent: May 6, 2014

(54) QUALITY-BASED STEERING METHODS AND SYSTEMS FOR 4D GEOPHYSICAL SURVEYS

(75) Inventors: Bengt Mikael Boberg, Singapore (SG); Jon Falkenberg, Jar (NO); Anders Goran Mattsson, Lysaker (NO)

(73) Assignee: PGS Geophysical AS, Oslo (NO)

( * ) Notice: Subject to any disclaimer, the term of this patent is extended or adjusted under 35 U.S.C. 154(b) by 384 days.

(21) Appl. No.: 13/216,978

(22) Filed: Aug. 24, 2011

(65) Prior Publication Data

US 2013/0051175 A1    Feb. 28, 2013

(51) Int. Cl.
*G01V 1/38* (2006.01)
(52) U.S. Cl.
CPC ............ *G01V 1/3835* (2013.01); *G01V 1/3817* (2013.01)
USPC .............................................. 367/16; 367/19
(58) Field of Classification Search
CPC ..................................................... G01V 1/3835
USPC ...................................................... 367/15–20
See application file for complete search history.

(56) References Cited

U.S. PATENT DOCUMENTS

| | | | |
|---|---|---|---|
| 3,832,762 A | 9/1974 | Johnston | |
| 4,481,611 A | 11/1984 | Burrage | |
| 4,617,518 A | 10/1986 | Srnka | |
| 5,723,790 A | 3/1998 | Andersson | |
| 5,790,472 A | 8/1998 | Workman et al. | |
| 5,955,884 A | 9/1999 | Payton et al. | |
| 6,011,752 A | 1/2000 | Ambs et al. | |
| 6,144,342 A | 11/2000 | Bertheas et al. | |
| 6,438,069 B1 | 8/2002 | Ross et al. | |
| 6,684,160 B1 | 1/2004 | Ozbek et al. | |
| 6,788,618 B2 | 9/2004 | Clayton et al. | |
| 6,873,571 B2 | 3/2005 | Clayton et al. | |
| 6,879,542 B2 | 4/2005 | Didier et al. | |
| 6,901,028 B2 | 5/2005 | Clayton et al. | |
| 6,985,403 B2 | 1/2006 | Nicholson | |

(Continued)

FOREIGN PATENT DOCUMENTS

WO    2005096018    10/2005

OTHER PUBLICATIONS

Seeger, Joseph I., et al., "Sense Finger Dynamics in a ΣΔ Force-Feedback Gyroscope", *Technical Digest of the Solid-State Sensor and Actuator Workshop*, (Jun. 2000), pp. 296-299, Hilton Head Island, SC.

(Continued)

*Primary Examiner* — Ian J Lobo

(57) ABSTRACT

A survey method includes towing one or more sources and one or more streamers behind a vessel to acquire geophysical survey data. Steering signals are determined for at least one of: the one or more sources, the one or more streamers, and the vessel. The steering signals minimize an error function having parameters that include a measure of a cross-line position error and a measure of data quality. The cross-line position error may be measured as an offset of the sources or the receivers from their desired paths, or in some embodiments as an offset between midpoints for base survey traces and subsequent survey traces. Some embodiments may employ a maximum spatial cross-correlation coefficient between a newly acquired trace and one or more base survey traces as a data quality measure, while others may employ a time shift, a phase rotation, or a normalized root mean square error. Data quality may indicate sensor noise levels.

23 Claims, 4 Drawing Sheets

(56) References Cited

U.S. PATENT DOCUMENTS

| | | | |
|---|---|---|---|
| 7,116,036 | B2 | 10/2006 | Balasubramaniam et al. |
| 7,222,579 | B2 | 5/2007 | Hillesund et al. |
| 7,298,672 | B1 | 11/2007 | Tenghamn et al. |
| 7,331,803 | B2 | 2/2008 | Steigerwald |
| 7,376,045 | B2 | 5/2008 | Falkenberg et al. |
| 7,423,929 | B1 | 9/2008 | Olivier |
| 7,642,784 | B2 | 1/2010 | Reddig et al. |
| 7,667,375 | B2 | 2/2010 | Berkcan |
| 7,671,598 | B2 | 3/2010 | Ronaess et al. |
| 7,800,976 | B2 | 9/2010 | Stokkeland et al. |
| 2005/0194201 | A1 | 9/2005 | Tenghamn et al. |
| 2007/0230721 | A1 | 10/2007 | White |
| 2007/0247971 | A1 | 10/2007 | Semb et al. |
| 2009/0310439 | A1 | 12/2009 | Hauan et al. |
| 2010/0118645 | A1* | 5/2010 | Welker .......................... 367/17 |

OTHER PUBLICATIONS

Chandrakasan, Anantha et al., "Trends in Low Power Digital Signal Processing", *Proceedings of IEEE International Symposium on Circuits and Systems*, (1998), pp. 604-607, vol. 4, Monterey, CA (USA).

Mitcheson, P.D. et al., "MEMS Electrostatic Micropower Generator for Low Frequency Operation", *Sensors and Actuators A*, (2004), pp. 523-529, vol. 115.

Ergen, Sinem C., "Zigbee/IEEE 802.15.4 Summary", *Advanced Technology Lab of National Semiconductor*, (Sep. 4, 2004), 37 pgs.

Lewis, Christopher P., et al., "Simulation of Micromachined Digital Accelerometer in SIMULINK and PSPICE", *UKACC International Conference on Control*, (Sep. 1996), pp. 205-209, vol. 1, Conf. Publ. No. 427.

Taner, Turhan (Tury) M., "*Semblance and Other Similarity Measurements*", (Nov. 1996),6 pgs.

Lee, Haksue et al., "A Micro-Machined Piezoelectric Flexural-Mode Hydrophone with Air Backing: Benefit of Air Backing for Enhancing Sensitivity", *J. Acoustical Society of America*, vol. 128, No. 3, Sep. 2010, pp. 1033-1044.

Choi, Sungjoon et al., "A Micro-Machined Piezoelectric Flexural-Mode Hydrophone with Air Backing: A Hydrostatic Pressure-Balancing Mechanism for Integrity Preservation", *J. Acoustical Society of America*, vol. 128, No. 3, Sep. 2010, pp. 1021-1032.

Smith, Paddy "It's All Acquisition's Fault", *Advanced Time-Lapse Seismic Acquisition Improves Quality and Delivers Results More Quickly, 4-D Seismic*, EPmag.com (Mar. 2011), pp. 49-51.

Rickert, William T., et al., "Systems and Methods for Wireless Communication in a Geophysical Survey Streamer", U.S. Appl. No. 13/073,832, filed Mar. 28, 2011.

Tenghamn, Stig Rune L., "Systems and Methods for Energy Harvesting in a Geophysical Survey Streamer", U.S. Appl. No. 13/073,823, filed Mar. 28, 2011.

Tenghamn, Stig Rune L., et al., "Digital Sensor Streamers and Applications Thereof", U.S. Appl. No. 13/206,002, filed Aug. 9, 2011.

Barr, Frederick J., et al., "Piezoelectric Sensors for Geophysical Streamers", U.S. Appl. No. 13/209,909, filed Aug. 15, 2011.

Barr, Frederick J., et al., "An Electrostatically Coupled Pressure Sensor", U.S. Appl. No. 13/209,940, filed Aug. 15, 2011.

United Kingdom Search Report for Application No. GB1214670.0, dated: Dec. 3, 2012.

\* cited by examiner

QUALITY-BASED STEERING METHODS AND SYSTEMS FOR 4D GEOPHYSICAL SURVEYS

BACKGROUND

In the field of geophysical prospecting, the knowledge of the earth's subsurface structure is useful for finding and extracting valuable mineral resources such as oil and natural gas. A well-known tool of geophysical prospecting is a "seismic survey." In a seismic survey, acoustic waves produced by one or more sources are transmitted into the earth as an acoustic signal. When the acoustic signal encounters an interface between two subsurface strata having different acoustic impedances, a portion of the acoustic signal is reflected back to the earth's surface. Sensors detect these reflected portions of the acoustic signal, and the sensors' outputs are recorded as data. Seismic data processing techniques are then applied to the collected data to estimate the subsurface structure. It should be noted that there are other geophysical survey techniques (e.g., gravimetric, magnetic, and electromagnetic surveys) that can be used to collect subsurface information and the present disclosure is also applicable to many of those survey systems.

Geophysical surveys can be performed on land or in water, and they can be repeated in order to track changes in the subsurface formations such as, e.g., reservoir depletion or movements of formation fluid interfaces. The use of such repeated surveys adds a time dimension to the data set, and accordingly it is often termed "Four-dimensional seismology" or "4D surveying". In a typical marine survey, up to 20 streamer cables and one or more sources are towed behind a vessel. A typical streamer includes hundreds or even thousands of sensors positioned at spaced intervals along its length, which can range from 2 to 12 km. The various streamer cables are typically positioned from 25 to 150 meters apart and are preferably towed in a generally parallel relationship so as to collect survey data over a fairly uniform sampling grid.

When streamers and sources are towed through the water, they are subject to the effects of water currents that often tend to pull them from their desired paths. To combat this tendency, the streamers and sources are typically equipped with positioning devices such as those disclosed in U.S. Pat. Nos. 6,011,752; 6,144,342; 6,879,542; 6,985,403; 7,222,579; 7,423,929; 7,800,976. See also U.S. Pat. App. 2007/0247971 "Four dimensional seismic survey system and method" by inventors Semb and Karlsen. Wings and position-maintaining birds are typical examples of steering devices that are controllable to regulate the horizontal displacement of the sources or streamers relative to their desired paths. Such devices, while helpful for maintaining streamer positions, are also sources of sensor noise due to the turbulence they can generate when pushing or pulling the streamer back into position. (Such sensor noise levels can be readily measured by the system between source actuations.) Of course, the vessel itself is steerable and its path is also a factor in determining the source and streamer paths during the survey.

When conducting repeated surveys, any mismatch in the streamer paths makes it more difficult to accurately resolve differences between survey results. On the other hand, strict enforcement of streamer path matching is expected to require excessive use of streamer positioning devices, which in turn would raise the sensor noise level above the acceptable threshold.

BRIEF DESCRIPTION OF THE DRAWINGS

A better understanding of the various disclosed embodiments can be obtained when the detailed description is considered in conjunction with the following drawings, in which.

Figure 1:
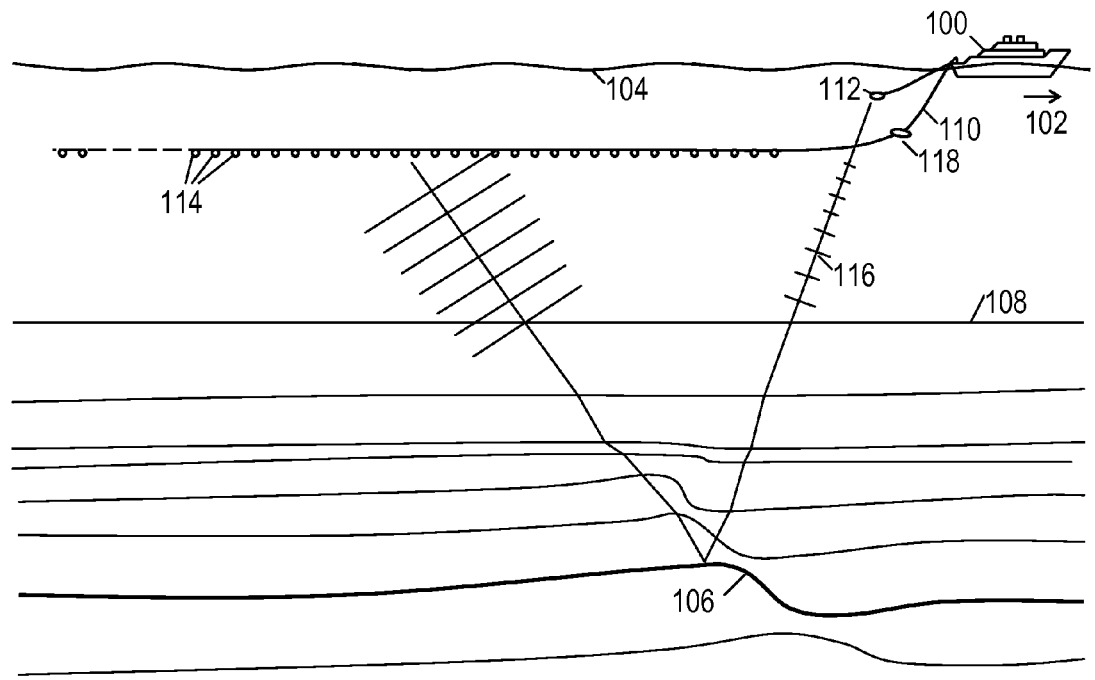
FIG. 1 is a diagram illustrating the principles of a marine seismic survey system according to an example embodiment.

While the invention is susceptible to various modifications, equivalents, and alternative forms, specific embodiments thereof are shown by way of example in the drawings and will herein be described in detail. It should be understood, however, that the drawings and detailed description thereto do not limit the disclosure, but on the contrary, they are examples of the modifications, equivalents, and alternatives that may fall within the scope of the appended claims.

DETAILED DESCRIPTION

The problems outlined in the background may be at least in part addressed by the disclosed 4D survey systems and methods. In at least some embodiments, a disclosed 4D survey method includes towing one or more sources and one or more streamers behind a vessel to acquire geophysical survey data, and determining steering signals for the source(s), the streamer(s), and/or the vessel. The steering signals minimize an error function having parameters that include: a data quality measure and a measure of a horizontal displacement of the one or more sources or the one or more streamers from their respective desired paths. The desired paths may be the paths that were followed in a base survey. Suitable data quality measures include a cross-correlation or other similarity measurement between newly acquired traces and traces from the base survey.

Figure 2:
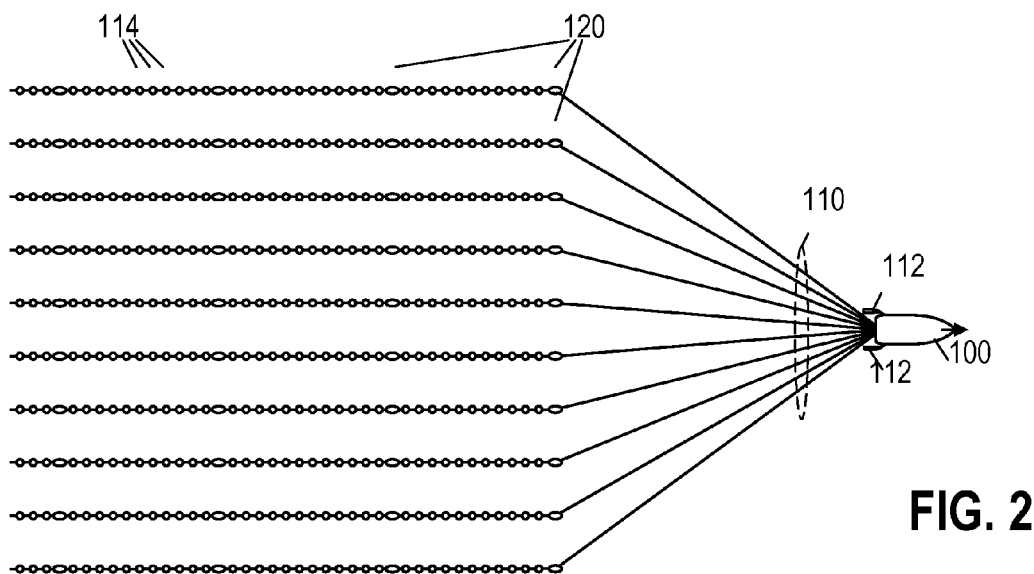
FIG. 2 is an overhead view of the exemplary survey system of FIG. 1.

FIGS. 1-2 show a suitable usage context for the disclosed systems and methods in the form of a marine seismic survey system, though of course the disclosed systems and methods are applicable to other marine geophysical survey systems. In the illustrated survey system a survey vessel or ship 100 moves forward 102 across the surface of a water body 104. As the ship moves, it tows an array of streamers 110 and one or more seismic sources 112. Each streamer 110 includes a set of spaced-apart seismic sensors 114 to detect seismic waves propagating through the water. Each streamer 110 further may include programmable positioning devices 118, 120 to control the operating depth and inter-streamer spacing. The sources 112 and indeed the ship itself also may include steering devices to control their motion and relative position to the other components and the desired paths for each of them.

As the ship 100 tows the sources 112 and streamers 114 along a survey line, the sources generate seismic waves 116 that reflect from acoustic impedance contrasts such as those caused by boundaries 106 between subsurface structures. The reflected seismic waves may be picked up by the seismic sensors 114, digitized, and communicated to a recording and control system on the ship 100. The recording and control system controls the operation of the positioning devices, the sources, and the receivers, and it records the acquired data.

Figure 3:
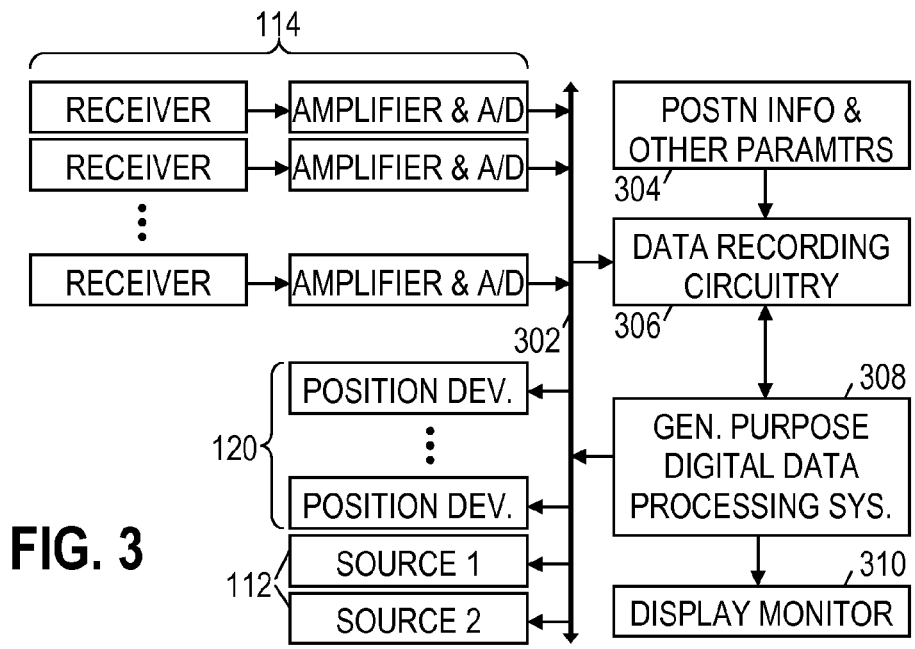
FIG. 3 is a function-block diagram of the exemplary survey system of FIG. 1.

FIG. 3 shows a function-block diagram for the illustrative survey system. Receivers, either individually or in groups, may have their signals amplified and digitized. A streamer bus 302 carries the digitized data to recording circuitry 306, which stores the seismic data along with survey information such as time and position information and other potentially relevant parameters from other sensors 304. The acquired information may be monitored by an appropriately-programmed general purpose data processing system 308, which further sends commands to alter the settings for the positioning devices 120 and commands to trigger the sources 112. As explained further below, general purpose data processing system 308 is programmed to adjust the steering parameters for the sources, the positioning devices, and/or the ship in a manner that minimizes an error function. The error function includes parameters indicative of the sources' and receivers' displacements from their desired paths, and further includes at least one parameter indicative of the data quality.

Figure 4:
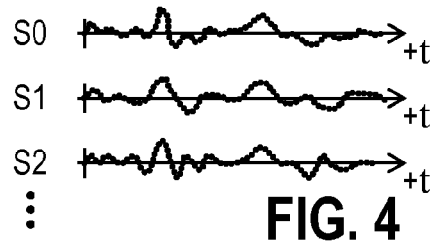
FIG. 4 is a graph of illustrating a set of exemplary signal traces.

FIG. 4 shows illustrative trace signals (S0, S1, S2, ... ) representative of the recorded receiver signals. The signals may be digitized signal voltages, but they normally represent some seismic wave attribute such as pressure, velocity, or acceleration. Each trace signal is associated with the position where the source was fired and the position of the acquiring receiver at the time the source was fired. In other words, each recorded trace has at least three aspects: a source position, a receiver position, and a time-based signal. From these three aspects, a great wealth of information can be derived.

Figure 5:
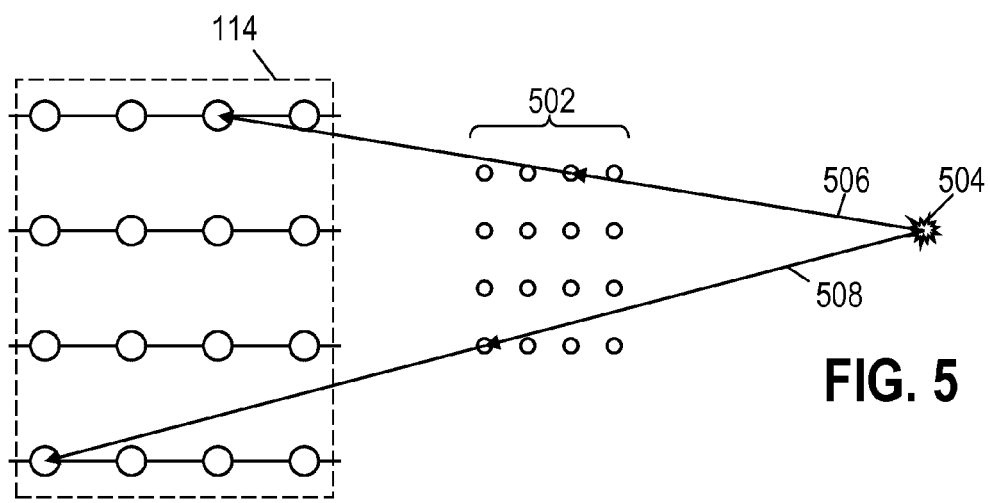
FIG. 5 is a diagram illustrating how source and receiver positions translate into midpoint positions associated with the various traces.

FIG. 5 shows an overhead view of the positions of a set of receivers 114 at the time a source 504 is triggered. If the subsurface formation layers are largely horizontal, the seismic energy that reaches the receivers does so by reflecting from a point about midway between the source and receiver positions. Thus, if a ray 506, 508 is traced from the source to each receiver, the midpoints 502 of those rays represent the approximate position of the reflections that resulted in the recorded trace signal. With this understanding, it becomes possible to convert the time-based signals to depth-based signals using a pre-existing or a derived velocity model.

Each firing of the source results in a pattern of midpoints 502 associated with the trace signals. (The midpoint pattern for each firing is a half-scale replica of the receiver position pattern.) As the survey proceeds, the sources are fired repeatedly and the receivers acquire traces associated with a new set of midpoints that largely overlap previous midpoints. All of the depth-based signals associated with a given midpoint can be added or "stacked" to increase their signal-to-noise ratio and provide a more accurate picture of the subsurface structure at that point.

Figure 6:
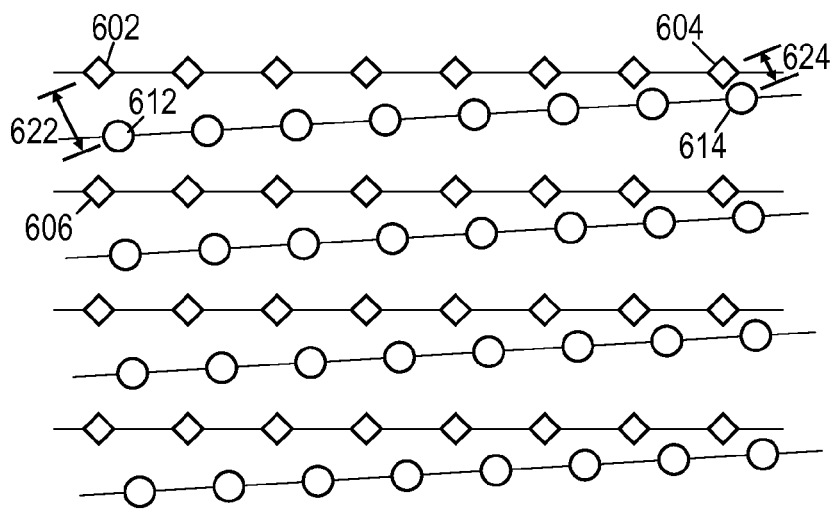
FIG. 6 is a diagram illustrating a misalignment between receiver (or midpoint) positions for base survey traces and newly acquired traces.

In four-dimensional seismology, a base survey is taken and is used for comparison with subsequent surveys of that region. For the comparisons to be as accurate as possible, it is desired to have the source and receiver positions for each of the traces (and hence the midpoint locations) in the subsequent surveys correspond closely to those of the base survey. Obstacles to this ideal include the prevailing water currents as well as incidental effects of turbulence and inaccuracies in the operation of the positioning devices. FIG. 6 illustrates a possible mismatch between the trace midpoints or receiver locations of a base survey (marked with diamonds) and those of a subsequent survey (marked with circles). The distance between corresponding midpoints varies from midpoint to midpoint. For example, between base survey midpoint 602 and subsequent survey midpoint 612 there is a mismatch 622. A smaller mismatch 624 is found between midpoints 604 and 614.

The midpoint mismatches can be expressed in terms of an in-line position error (measured parallel to the x-axis) and a cross-line position error (measured parallel to the y-axis). The in-line position error is primarily a function of the source firing times and is substantially independent of any operations by the positioning devices. Moreover, the sensors are usually more densely spaced in the in-line direction than in the cross-line direction, meaning that trace interpolation in the in-line direction is usually an adequate remedy for any in-line position errors. As such, in-line positioning errors will be largely neglected in the following discussion.

Figure 7:
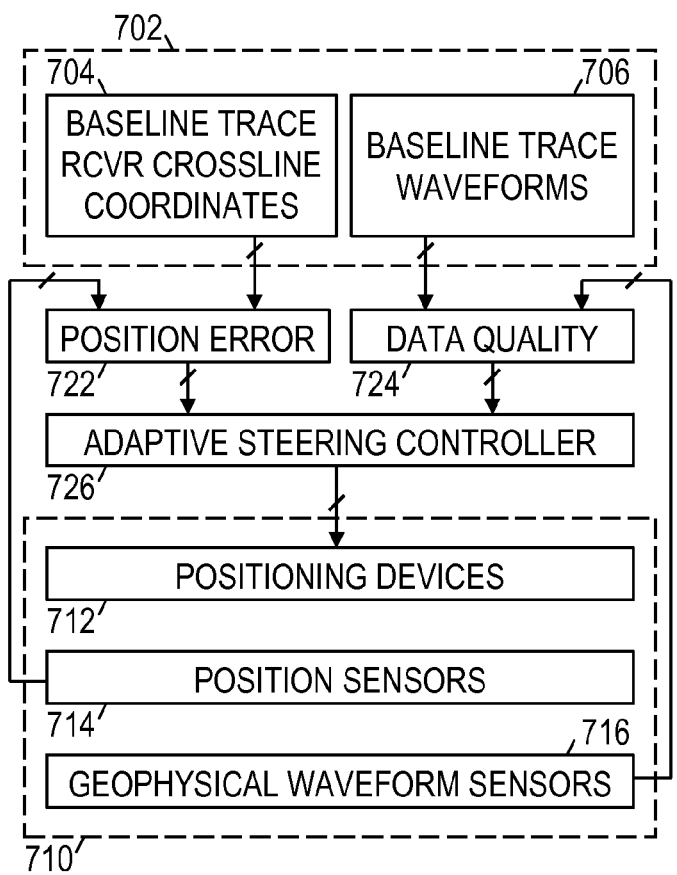
FIG. 7 is a data flow diagram of an illustrative steering component suitable for use in 4D surveys.

FIG. 7 shows a data flow diagram for a 4D survey steering system. A database for a base survey 702 includes information regarding the midpoint locations 704 associated with each trace, or alternatively includes information regarding the source and receiver locations for each trace. Because the cross-line coordinates are a function of the ship's position and direction of motion, it is contemplated that the midpoint locations 704 will be stored in some standard geodetic location format and the cross-line coordinates of these locations will be derived as needed. The database for the base survey 702 further includes the time- or depth-dependent trace signals 706.

FIG. 7 also shows selected components of the 4D survey system 710, including positioning devices 712, position sensors 714, and geophysical signal sensors 716. The positioning devices 712 may include, e.g., the programmable positioning devices 118, 120 for both the streamers and the sources, as well as the rudders and steering jets of the ship 100. The position sensors 714 may include global navigation satellite system (GNSS) sensors attached to the ships, the floats for the sources, and the streamer buoys; and may further include streamer-mounted acoustic ranging units and heading devices (which can be magnetic or gyroscopic). Any of these position sensors can be used alone or in combination with other sensors to determine positions of each geophysical sensor and source either in absolute terms or in relation to each other and the ship. The geophysical signal sensors 716 can be the seismic sensors 114 discussed previously, or they may represent the magnetic, electromagnetic, gravimetric, or other suitable sensing transducers for the type of geophysical survey being conducted.

A processing device (such as, e.g., the general purpose processing system 308 in FIG. 3) has hardware or software components 722-726 that cooperate with the base survey database 702 and the other components of the 4D survey system 710 to provide and adjust steering signals. As the survey ship progresses along a sail line traveled in the base survey, a position error component 722 identifies the midpoint locations for those traces in the base survey that correspond to the current firing and the next firing, and employs in-line interpolation as the ship travels between firing points to provide smooth coordinate transitions. The position error component 722 subtracts the cross-line coordinates for each midpoint location in the base survey from the cross-line coordinates of the corresponding midpoint locations in the current survey, thereby producing a position error signal for each trace.

A data quality component 724 may measure sensor noise levels, e.g., by examining trace signals during quiet periods before or after the geophysical signal energy impinges on the sensors. Alternatively, the data quality component 724 may compare the trace signals from the current firing with the corresponding trace signals from the base survey. Various suitable forms exist for the comparison. In some embodiments, a cross-correlation coefficient is used to measure how well the base survey and current survey trace signals match. Where $b_i$ represents a sampled trace signal from the base survey, $a_i$ represents a sampled trace signal from the current survey, and $\tau$ represents a time shift or depth shift, the cross-correlation coefficient $c(\tau)$ is expressible as:

$$c(\tau) = \frac{\sum_i b_i a_{i+\tau}}{\sqrt{\sum_i b_i^2} \sqrt{\sum_i a_i^2}}. \tag{1}$$

When the sampled trace signals are functions of depth, equation (1) provides a spatial cross-correlation coefficient, whereas for time-based trace signals equation (1) provides a temporal cross-correlation coefficient. Either may be used at the option of the system designer. The cross-correlation coefficient at $\tau=0$ is one measure of the similarity between the traces, but more commonly the maximum cross-correlation coefficient value is used. The time shift or depth shift $\tau_m$ that yields the maximum value can also be used as a measure of the traces' similarity. If the analysis is performed in the frequency domain, the similarity measure may be the phase rotation $\exp(j\omega\tau_m)$, which corresponds to the time or depth shift $\tau_m$. An alternative similarity measure is the semblance between the base survey trace and the current survey trace:

$$S = \frac{\sum_i (b_i + a_i)^2}{2(\sum_i b_i^2 + \sum_i a_i^2)}. \tag{2}$$

The data quality component 724 can alternatively employ other similarity measures, such as the root mean square error $$\varepsilon = \sqrt{\frac{1}{N} \sum_i (b_i - a_i)^2} \tag{3}$$

(If, as is often the case, the sampled trace signals $a_i$ and $b_i$ have been normalized, equation (3) results in the normalized root mean square error, which is another suitable similarity measure.) These similarity measures are illustrative examples and not limiting to the scope of the disclosure. For each trace, the data quality component 724 produces a measure of the mismatch between that trace and the corresponding trace from the subsequent survey.

A horizontal displacement error can be derived based on the similarities between the current survey trace and a set of base survey traces around the most probable location of the midpoint for the current survey trace. The horizontal displacement error can be found as the distance between the midpoints for the current survey trace and the most similar base survey trace. The lateral control of the vessel, source(s), and streamers can be based on the similarity measures or on the horizontal displacement errors derived from the similarity measures. If the system just measures the similarity between each current survey trace and one corresponding base survey trace, it may be termed a "single point based system". If the system measures the similarity between a group of current survey traces and a group of base survey traces (perhaps as a prelude to deriving the horizontal displacement error), it may be termed a "patch-based system".

A steering controller 726 operates on the position errors and the mismatch errors derived for each trace or on the horizontal displacement errors and produces steering signals for each of the positioning devices. One illustrative embodiment for the steering controller in a single point based system provides steering signals $s_k$ by filtering the position error signals $e_t$ and the data quality values $q_t$:

$$s_{k,i} = \sum_{t \in T_{k,i}} \left[ u_{k,t} \sum_{n=0}^{N-1} [v_{k,n} q_{t,i-n} + w_{k,n} e_{t,i-n}] \right]. \tag{4}$$

In equation (4), k is the steering signal index that indicates which positioning device the steering signal controls; i is the time index; t is the trace index which is drawn from the set of traces T that are affected by positioning device k; $v_{k,n}$ and $w_{k,n}$ are the filter coefficients for the data quality values $q_t$ and position error signals $e_t$, respectively; and $u_{k,t}$ is a weight factor that determines how much trace t influences steering signal $s_k$. The filter coefficients in this embodiment can be made adaptive so that the acquired trace data minimizes error functions defined by the summed squares of the data quality values $q_t$ and position error signals $e_t$:

$$E_k = \sum_i \sum_{t \in T_{k,i}} u_{k,t}^2 (q_{t,i}^2 + e_{t,i}^2) \tag{5}$$

Many suitable adaptation algorithms exist, including the least-mean-square adaptation algorithm which adapts the filter coefficients $w_{k,n}$ in accordance with the equation $$w_{k,n,i+1} = w_{k,n,i} + \mu s_{k,i} \sum_{t \in T_{k,i}} u_{k,t} e_{t,i-n}, \tag{6}$$

where $\mu$ is an adaptation step size that is chosen to balance system stability against the rate of adaptation. The equation for adapting the filter coefficients $v_{k,n}$ is similar.

$$v_{k,n,i+1} = v_{k,n,i} + \mu s_{k,i} \sum_{t \in T_{k,i}} v_{k,t} q_{t,i-n}, \tag{7}$$

More details on the least-mean-square adaptation algorithm and other suitable adaptation algorithms can be found in textbooks on adaptive filter design.

Figure 8:
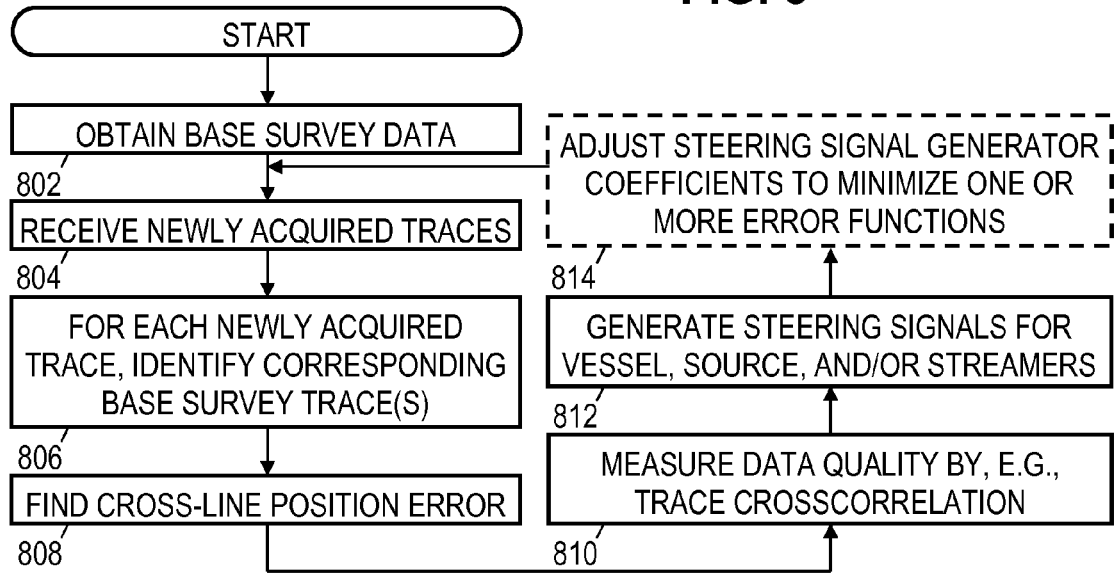
FIG. 8 is a flow diagram illustrating a 4D survey method according to an example embodiment.

With this understanding, we now turn to FIG. 8 which is a flow diagram of an illustrative 4D survey method embodiment. Beginning in block 802, the system is provided with trace data from a base survey, including the signals and the midpoint or source & receiver locations associated with the various traces. In block 804 the system receives newly acquired trace data, again including the signals and the midpoint or source and receiver locations. In block 806, the system determines the correspondence between the newly acquired traces and the traces from the base survey so as to establish for each newly measured signal and newly determined midpoint position a respective signal and midpoint position from the base survey. For patch-based systems, block 806 determines a group of base survey traces that correspond to a group of newly measured traces. Some embodiments may employ interpolation to fill in values for gaps in the base survey data.

In block 808, the system determines the cross-line position errors between the respective midpoints of the base and subsequent surveys. In block 810, a single-point based system determines the data quality measure by measuring the similarity between the respective signals of the base and subsequent surveys. A patch-based system may derive a horizontal displacement error by, for example, determining the cross-correlation peak or other similarity measure indicating the best-matching group of base survey traces for the recently acquired group of traces. Then the displacement error is extracted as the distance between the midpoint for the base survey traces yielding the correlation peak and the midpoint of the recently acquired traces.

In block 812, the single-point based system operates on the position errors and the data quality measures to generate steering signals for one or more of the vessel, the sources, and the streamer positioning devices. The patch-based system may use the horizontal displacement error weighted with a corresponding uncertainty/quality measure that, for example, could be extracted from the cross-correlation information as the width of the cross-correlation peak. Optimal weighting strategies would also account for the measuring uncertainty of the various position sensing devices. An optional block 814 represents the system's dynamic adaptation of the steering generator coefficients to minimize the error functions of equation (5). If a non-adaptive system embodiment is chosen, the coefficients can be programmed on the basis of a modeled system and can be similarly chosen to minimize an error function that includes both position error and data quality as parameters. In each case the error functions are a representation of the system's performance and the minimization of the error functions corresponds to an optimal system performance.

Numerous equivalents, variations and modifications will become apparent to those skilled in the art once the above disclosure is fully appreciated. For example, the ready translation from source and receiver positions to midpoint positions means that either can be used to measure cross-line position errors. The data quality measure need not be limited to two corresponding traces—rather each newly acquired trace may be compared with an average of a group of traces around the location associated with the newly acquired trace. The survey system need not be limited to a single vessel, and in some embodiments the sources may be towed by one or more vessels other than the vessel towing the streamer array. The following claims should be interpreted to embrace all such equivalents, variations and modifications.

What is claimed is:

1. A survey method that comprises:
towing one or more sources and one or more streamers behind a vessel to acquire geophysical survey data; and
determining a steering signal for at least one of: the one or more sources, the one or more streamers, and the vessel,
wherein the steering signal minimizes an error function having parameters that include a measure of a cross-line position error and a measure of data quality.

2. The method of claim 1, wherein the cross-line position error is measured as an offset of the sources or the receivers from their desired paths.

3. The method of claim 2, wherein the desired paths are paths taken in a base survey, and wherein the measure of data quality is based at least in part on a newly acquired trace signal and one or more base survey trace signals.

4. The method of claim 1, wherein the cross-line position error is measured as an offset between midpoints for base survey traces and subsequent survey traces.

5. The method of claim 1, wherein the measure of data quality is determined based at least in part on a newly acquired trace signal and a group of trace signals from around a location associated with the newly acquired trace signal.

6. The method of claim 1, wherein the measure of data quality is indicative of a maximum spatial cross-correlation coefficient between at least one newly acquired trace signal and at least one trace signal from the base survey.

7. The method of claim 1, wherein the measure of data quality is determined based at least in part on a newly acquired trace signal and a base survey trace signal and is indicative of at least one of: a time shift, a phase rotation, and a normalized root mean square error.

8. The method of claim 1, wherein the measure of data quality is indicative of a sensor noise level.

9. The method of claim 1, wherein the operation of determining a steering signal includes filtering the cross-line position error and the measure of data quality with adaptive filter coefficients.

10. The method of claim 1, wherein the sources are seismic energy sources and the streamers acquire seismic survey data.

11. The method of claim 1, wherein the sources are electromagnetic energy sources and the streamers acquire electromagnetic survey data.

12. A survey system that comprises:
one or more sources;
one or more streamers; and
a vessel that tows the one or more sources and the one or more streamers, the vessel including a data acquisition and control system configured to record source and streamer position information and further configured to record trace signals newly acquired by the one or more streamers,
wherein the data acquisition and control system is configured to generate a steering signal for at least one of: the one or more sources, the one or more streamers, and the vessel, wherein the steering signal minimizes an error function having parameters that include a cross-line position error measure and a data quality measure.

13. The system of claim 12, wherein the one or more sources and the one or more streamers have positioning devices responsive to the steering signal.

14. The system of claim 12, wherein the cross-line position error measure is indicative of horizontal source and streamer displacements from associated paths in a base survey.

15. The system of claim 12, wherein the data quality measure is indicative of how similar newly acquired traces are to traces acquired in a base survey.

16. The system of claim 15, wherein the measure of data quality is indicative of maximum spatial cross-correlation coefficients.

17. The system of claim 15, wherein the measure of data quality is indicative of at least one of: a time shift, a phase rotation, and a normalized root mean square error.

18. The system of claim 12, wherein the measure of data quality is indicative of a sensor noise level.

19. The system of claim 12, wherein the data acquisition and control system is configured to generate the steering signal using an adaptive filter.

20. A survey system that comprises:
a first vessel towing one or more sources;
a second vessel towing one or more streamers, the second vessel including a data acquisition and control system configured to record streamer position information and further configured to record trace signals newly acquired by the one or more streamers, wherein the data acquisition and control system is configured to generate a steering signal for at least one of: the one or more streamers, and the second vessel, wherein the steering signal minimizes an error function having parameters that include a cross-line position error measure and a data quality measure.

21. The system of claim 20, wherein the cross-line position error measure is indicative of horizontal streamer displacements from associated paths in a base survey.

22. The system of claim 20, wherein the data quality measure is indicative of how similar newly acquired traces are to traces acquired in a base survey.

23. The system of claim 20, wherein the measure of data quality is indicative of a sensor noise level.

* * * * *